（12）United States Patent
Quinlivan

(10) Patent No.: US 9,353,524 B2
(45) Date of Patent: May 31, 2016

(54) EMERGENCY UTILITY CONNECTION FOR MISSION CRITICAL FACILITIES

(75) Inventor: David J. Quinlivan, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 117 days.

(21) Appl. No.: 14/131,880

(22) PCT Filed: Jun. 5, 2012

(86) PCT No.: PCT/US2012/040908
§ 371 (c)(1),
(2), (4) Date: Jul. 7, 2014

(87) PCT Pub. No.: WO2013/009411
PCT Pub. Date: Jan. 17, 2013

(65) Prior Publication Data
US 2014/0311066 A1    Oct. 23, 2014

Related U.S. Application Data

(60) Provisional application No. 61/507,022, filed on Jul. 12, 2011.

(51) Int. Cl.
H02G 3/22      (2006.01)
E04C 2/52      (2006.01)
H02G 3/10      (2006.01)
H02G 3/38      (2006.01)
G05B 9/02      (2006.01)
G05B 15/02     (2006.01)

(52) U.S. Cl.
CPC . *E04C 2/521* (2013.01); *G05B 9/02* (2013.01); *G05B 15/02* (2013.01); *H02G 3/10* (2013.01); *H02G 3/286* (2013.01)

(58) Field of Classification Search
CPC ......... E04C 2/521; E04C 2/523; E04C 2/525; H02G 3/22; H02G 3/286; H02G 3/36; H02G 3/08; H02G 3/10; H02G 3/386; H02G 3/388
See application file for complete search history.

(56) References Cited

U.S. PATENT DOCUMENTS 4,394,706 A  *  7/1983  Crafts ........................... 361/836
RE31,359 E  *  8/1983  Nickola .................. H02B 1/50
                                           174/45 R
4,778,399 A  *  10/1988 Schenk ......................... 439/147
4,811,163 A  *  3/1989  Fletcher ................. H01H 9/542
                                           307/141.8

(Continued)

OTHER PUBLICATIONS

International Search Report and Written Opinion, Korean International Search Authority, Completed Dec. 24, 2012, Mailed Dec. 27, 2012.

*Primary Examiner* — Robert Canfield
(74) *Attorney, Agent, or Firm* — Workman Nydegger

(57) ABSTRACT

Systems and methods which utilize a connection panel having multiple connection types in order to connect supplemental or emergency utility services to a building are provided. The connection panel may be pre-fabricated or engineered to simplify construction and subsequent utility connections. Further, embodiments may dispose standardized utility connections on the connection panel. Upon connecting supplemental sources to the connection panel, embodiments may also include switching systems, such as valves, electrical switches, etc., configured to connect the supplemental sources to infrastructure located in the building.

18 Claims, 3 Drawing Sheets

(56) References Cited

U.S. PATENT DOCUMENTS

| | | | |
|---|---|---|---|
| D308,464 S * | 6/1990 | Freeman et al. | D8/353 |
| 5,359,820 A * | 11/1994 | McKay | 52/34 |
| 5,650,773 A * | 7/1997 | Chiarello | 340/691.8 |
| 5,739,594 A * | 4/1998 | Sheppard | H02J 9/06 307/126 |
| 5,761,027 A * | 6/1998 | Flegel | H02B 1/056 361/664 |
| D411,734 S * | 6/1999 | Hsiang | D8/353 |
| 5,953,871 A * | 9/1999 | MacConnell et al. | 52/220.1 |
| 6,137,191 A * | 10/2000 | O'Leary | H02J 3/005 307/116 |
| 6,169,340 B1 * | 1/2001 | Jones | H02J 9/066 307/64 |
| 6,181,028 B1 * | 1/2001 | Kern | H02J 9/06 307/64 |
| 6,393,775 B1 * | 5/2002 | Staschik | 52/79.1 |
| 6,510,608 B1 * | 1/2003 | Marshall et al. | 29/869 |
| 6,624,534 B1 * | 9/2003 | Flegel | H02G 3/00 307/43 |
| 6,630,752 B2 * | 10/2003 | Fleming | H02J 3/005 307/64 |
| 6,712,619 B2 * | 3/2004 | Marshall et al. | 439/34 |
| 6,849,967 B2 * | 2/2005 | Lathrop | H02J 9/08 307/64 |
| 6,876,103 B2 * | 4/2005 | Radusewicz et al. | 307/64 |
| 6,879,060 B2 * | 4/2005 | Hohri | H02J 9/061 307/29 |
| 7,005,760 B2 * | 2/2006 | Eaton | H02J 9/06 307/116 |
| 7,015,404 B2 * | 3/2006 | Sodemann | H02J 3/38 200/51 R |
| 7,015,599 B2 * | 3/2006 | Gull et al. | 307/85 |
| 7,204,268 B2 * | 4/2007 | Jin | 137/493.9 |
| 7,204,714 B2 * | 4/2007 | Walker et al. | 439/532 |
| 7,259,481 B2 * | 8/2007 | Eaton | H02J 9/06 307/125 |
| 7,599,171 B1 * | 10/2009 | Remmert | H02J 9/062 307/64 |
| 7,749,380 B2 * | 7/2010 | Yungner et al. | 210/143 |
| 7,775,000 B2 * | 8/2010 | Walker et al. | 52/200 |
| 7,864,509 B1 * | 1/2011 | Remmert | H02B 1/056 361/631 |
| 8,138,634 B2 * | 3/2012 | Ewing | H02J 9/06 200/50.32 |
| 8,395,884 B1 * | 3/2013 | Czarnecki | 361/643 |
| 8,587,136 B2 * | 11/2013 | Williams | 290/1 R |
| 8,700,224 B2 * | 4/2014 | Mathiowetz | H02J 3/14 307/85 |
| 9,035,782 B1 * | 5/2015 | Flegel | 340/644 |
| 2002/0037662 A1 * | 3/2002 | Lee | H01R 13/516 439/373 |
| 2002/0057145 A1 * | 5/2002 | Kern et al. | 335/6 |
| 2002/0084697 A1 * | 7/2002 | Radusewicz | H02J 9/06 307/64 |
| 2004/0134533 A1 * | 7/2004 | Cowan | 137/209 |
| 2004/0197238 A1 | 10/2004 | Mirkovic et al. | |
| 2005/0033479 A1 * | 2/2005 | Parker | 700/282 |
| 2005/0134121 A1 * | 6/2005 | Lathrop | H02J 3/005 307/80 |
| 2006/0028069 A1 * | 2/2006 | Loucks | H02J 3/005 307/130 |
| 2009/0058191 A1 * | 3/2009 | Nordman et al. | 307/112 |
| 2010/0145475 A1 | 6/2010 | Bartels et al. | |
| 2012/0267957 A1 * | 10/2012 | Czarnecki | H02J 3/02 307/64 |
| 2013/0061538 A1 * | 3/2013 | Hunt et al. | 52/27 |
| 2013/0214605 A1 * | 8/2013 | Evans et al. | 307/80 |
| 2014/0312695 A1 * | 10/2014 | Czarnecki | 307/41 |

* cited by examiner

EMERGENCY UTILITY CONNECTION FOR MISSION CRITICAL FACILITIES

CROSS-REFERENCE TO RELATED APPLICATIONS

The present application claims the benefit of and priority to PCT Application No. PCT/US2012/040908, filed Jun. 5, 2012, entitled "Emergency Utility Connection for Mission Critical Facilities", which claims the benefit of and priority to U.S. Provisional Application No. 61/507,022, filed on Jul. 12, 2011, entitled "Emergency Utility Connection for Mission Critical Facilities", each of which is incorporated by reference herein in its entirety.

BACKGROUND

In general, commercial buildings, research facilities, hospitals, manufacturing facilities and the like, have separate sources for utilities such as steam, water, natural gas, etc. In such buildings, backup systems, such as emergency generators, are generally designed to facilitate life safety and emergency evacuation situations. Rarely, if at all, are provisions made to provide temporary or emergency connections for all other services. As such, if hot water, steam or some other utility is needed, most likely there is no provision in the initial design of the building to make those connections for backup or emergency purposes.

For example, in a research facility if there is an ongoing experiment that requires an uninterrupted supply of steam to control the experiment, but a utility is shut down due to an emergency, equipment failure, etc., there are generally no provisions in place to make temporary connections. In such circumstances, if temporary provisions must be made, one may be forced to run temporary supply lines through an existing structure within the walls of the facility (e.g. ventilation areas), which is generally complicated and can become very expensive. Alternatively, temporary supply lines may be run outside of the walls. However, this leads to circumstances where the supply lines are visible to the occupants of the facility, and potentially exposes the supply lines to possible physical harm depending on the type of work undertaken in the facility, both of which are undesirable.

Another issue that is apparent when attaching a temporary utility supply to an existing building structure is that the manner of attaching such a supply may be highly dependent on the infrastructure of the building itself. This leads to safety concerns because an improper connection may cause adverse results, e.g. contamination of a water supply, mismatched phasing for electrical connections, and the like. Additionally, capital cost may need to be expended to actually add infrastructure to the building in order to facilitate temporary utility supplies. Depending on the specific temporary needs, such costs can become very prohibitive.

BRIEF SUMMARY

The present application provides systems and methods which utilize a connection panel with multiple connection types in order to connect supplemental or emergency utility services to a building. The connection panel may be pre-fabricated or engineered to simplify construction and subsequent utility connections. Further, embodiments may dispose standardized utility connections on the connection panel. Upon connecting supplemental sources to the connection panel, embodiments may also include switching systems (e.g. valves, electrical switches, etc.) configured to connect the supplemental sources to infrastructure located in the building.

One representative embodiment may be characterized as a method for providing supplemental utility access to a building facility. The method includes forming a panel with multiple utility connection points corresponding to multiple utility types, with the connection points configured to connect to one or more supplemental utility sources. In addition, the method comprises configuring switching and/or valve mechanisms within the building facility to connect supplemental utility sources to the internal utility infrastructure of the building.

Another representative embodiment may be characterized as a building with a wall area having a supplemental utility connection panel located within the wall area, the supplemental utility connection panel including multiple connection points corresponding to at least two utility types.

Yet another representative embodiment is supplemental utility connection panel with a structural backing area having multiple connection points, where the connection points correspond to multiple utility types. The connection points are configured to accept a connection from one or more supplemental utility sources and further configured to connect to internal infrastructure connection points for one or more respective utility types.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which.

DETAILED DESCRIPTION

Figure 1:
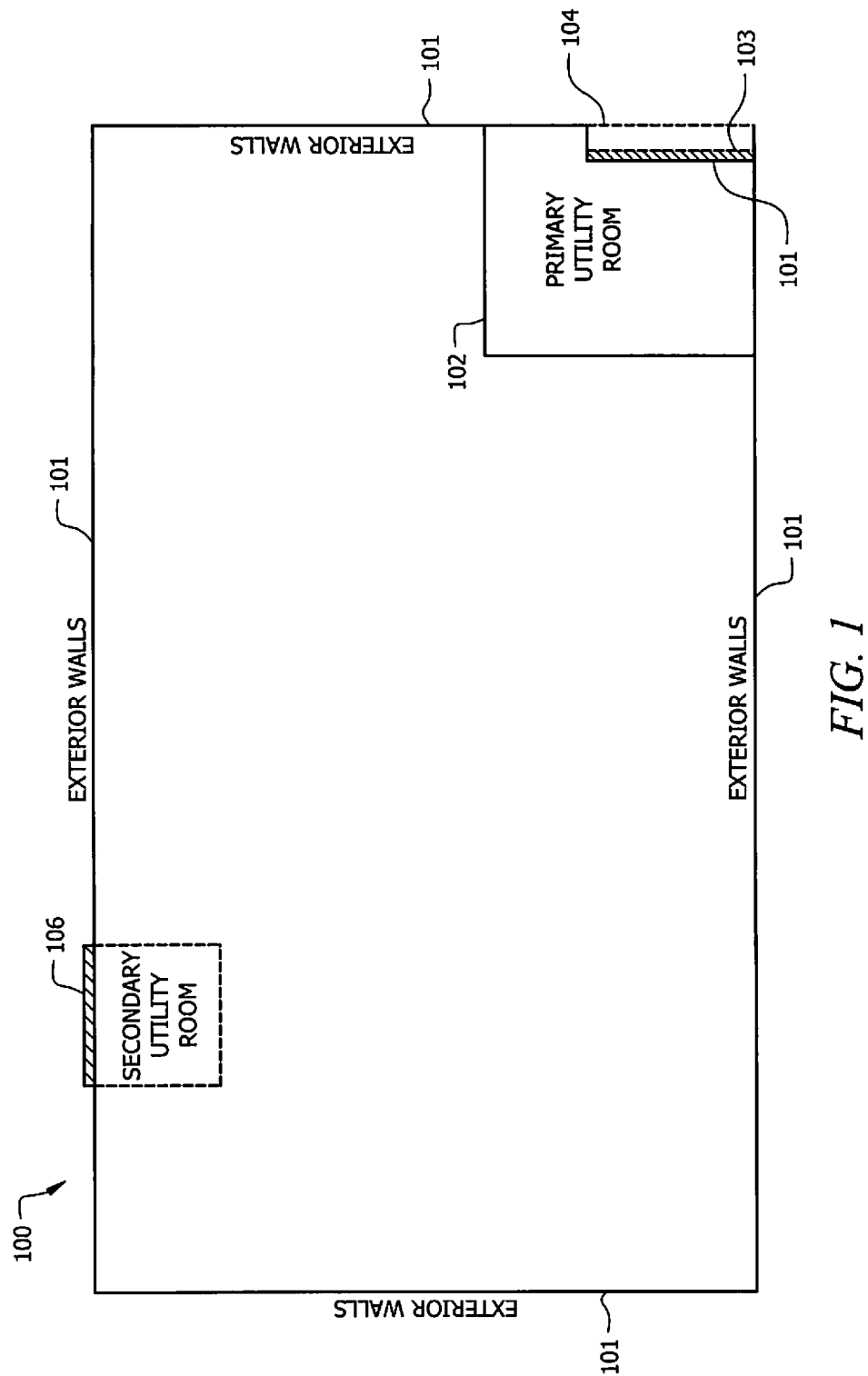
FIG. 1 illustrates a plan view of a building which incorporates various aspects in accordance with an example embodiment of the present application.

FIG. 1 illustrates a plan view of building 100 which incorporates various aspects in accordance with an example embodiment of the present application. As discussed above, building 100 may be a commercial building such as a research facility, warehouse, hospital, etc. Additionally, some embodiments may implement building 100 in a residential setting. Building 100 has exterior walls 101 which provide sufficient exterior protection in accordance with the type of building being implemented.

Building 100 also includes utility room 102 which may also be referred to as a mechanical and electrical room. Utility room 102 is a location in building 100 which includes one or more of heating/air conditioning sources, boilers, central electrical breakers, water heaters, oxygen supply storage, steam generators, HVAC chillers, phone lines, data lines, supply fans, exhaust fans, manufacturing process cooling or heating, waste water treatment, purified water production, and the like.

Supplemental utility connection panel 103 may be included along an exterior wall 101 of building 100. Supplemental utility connection panel 103 may include connection points for one or more utilities configured to service building 100. For example, supplemental utility connection panel 103 may be configured with input components configured to receive supplemental utilities such as an electrical connection configured to connect to a backup generator, a hot/cold water supply connection configured to connect to a water source, a pressurized gas connection configured to receive gas from a supply source, and the like.

Supplemental utility connection panel 103 may be enclosed by door 104 to protect the panel from elements and/or to secure the panel to prevent tampering. Also, door 104 may be included for aesthetic purposes. Door 104 may be a garage-type door, a roll up door, or may be implemented in any other manner to facilitate the desired purposes of door 104. Supplemental utility connection panel 103 may also be located in an exterior area with sufficient space to house one or more supplemental sources. These supplemental sources may be located within the space enclosed by door 104, located outside such space while facilitating the ability to establish connections between a supplemental source and supplemental utility connection panel 103, or located in any other manner which would be functional to provide the desired utilities.

It is noted that supplemental utility connection panel 103 is located adjacent to utility room 102 in the illustrated embodiment. Such a location may facilitate convenient connections. However, it is contemplated that supplemental utility connection panel 103 may be located in other areas which may be useful when taking into account building design preferences. For example, it may be preferable to locate supplemental utility connection panel 103 in an area which is adjacent to flat surfaces around the exterior of the building in order to facilitate placement of supplemental generators, storage tanks, and the like. Further, it may be preferable to locate supplemental utility connection panel 103 in an area so as to avoid pedestrian traffic near where supplemental sources are utilized.

Figure 2:
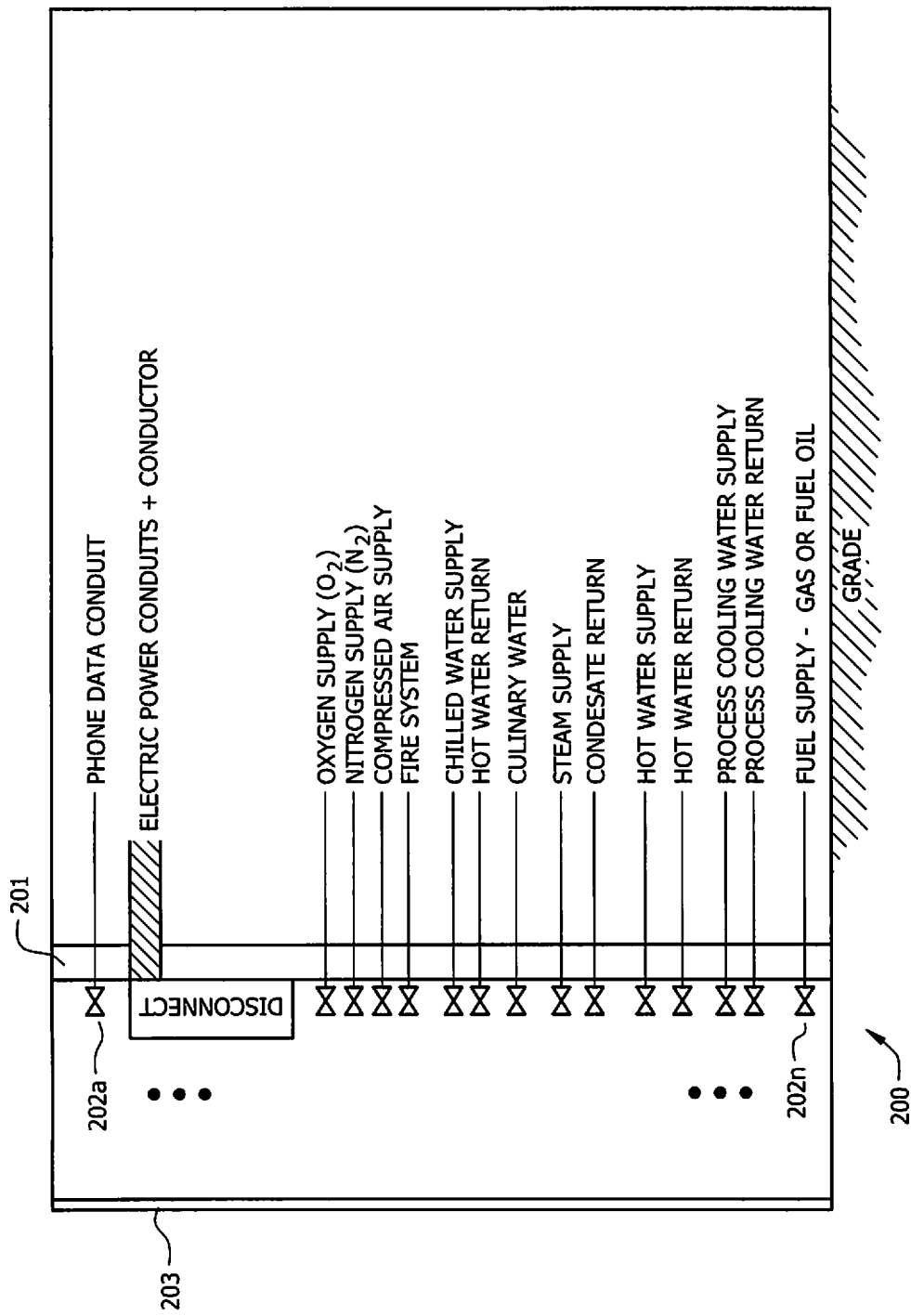
FIG. 2 illustrates an exploded view of a connection panel area in accordance with an embodiment of the present application.

Further, it is contemplated that building 101 may have multiple utility rooms, such as secondary utility room (shown in FIG. 2). In such circumstances, it is contemplated that embodiments may configure the connections on supplemental utility connection panel 103 to supplement utilities originating from the secondary utility room. Conversely, it may be preferable to have a secondary supplemental connection panel 106 to provide for these utilities. Considerations regarding the use of multiple utility rooms and multiple connection panels may take into account building parameters which effect the convenience of locating these resources and any potential supplemental resources. For example, when providing a supplemental connection for a utility located in secondary utility room on supplemental utility connection panel 103, one may account for the type of effort would be required to run connection lines from the secondary utility room to supplemental utility connection panel 103. Additionally, when determining whether to utilize a secondary connection panel, such as secondary supplemental utility connection panel 106, it may be preferable to take into account the exterior conditions of building 100 (e.g. where flat surfaces are located, avoiding pedestrian traffic, etc.). In other words, the present application does not intend to limit placement of utility rooms and/or connection panels to specific locations. Different locations may be utilized which may be taken into account in accordance with possible building design considerations.

Additionally, as discussed herein, supplemental connections may be implemented for many reasons such as for emergency backup, maintenance support, and to provide additional capacity for a given utility. An example case where providing additional capacity of a utility may be implemented is seen in the circumstance where a particular utility capacity within a building utilized beyond its design limits. For example, boiler systems may be configured to heat a building in accordance with winter weather extremes. However, during a particularly cold winter, such boilers are insufficient. In such circumstances, a supplemental boiler may be attached to building 100 in order to assist the heating supply.

FIG. 2 illustrates an exploded view of a connection panel area 200 in accordance with an embodiment of the present application. Connection panel area 200 includes panel 201 which may be implemented as an interior building wall 203, a panel system mounted to a wall, or as an exterior wall such as exterior wall 101 discussed above. Utility connections 202a-202n are disposed or stubbed through panel 201. Utility connections 202a-202n may include any utility connection which may be desirable to supplement or to provide emergency back-up services for in a given facility. As shown in FIG. 2, utility connections include, for example, a phone/data, electric power, hot and/or cold water supplies and corresponding return infrastructure, steam supply and return infrastructure, fuel supply (e.g. gas, oil, etc.), compressed air, nitrogen, and oxygen connections. The example connections shown in FIG. 2 are not intended to be limiting. It is noted that various building facilities may have differing supplemental utility needs based on the type of activities undertaken in such buildings.

In some embodiments, connections 202a-202n may be further connected to switching mechanisms, valve systems, and the like in order to connect exterior sources into the infrastructure within a building via connections 202a-202n. Such mechanisms or systems may be configured to work in lieu of, or in conjunction with existing supply sources within a given facility. For example in order to connect supplemental phone/data connections it may be advantageous to provide switching circuitry. Such circuitry may be implemented to bypass existing systems within a facility. Additionally, switching circuitry may be configured to allow for supplemental provisions to function in conjunction with existing systems. Likewise, when connecting a water or steam supply, bypass valves may be utilized to connect the supplemental sources to function instead of, or in addition to existing utility supply systems.

It is noted that the switching mechanisms and valve systems discussed herein may be implemented within a given building, within a utility room, or may be controlled externally at the location of a connection panel. Such switching may be implemented using various means, such as mechanical, electrical, or the like, or combinations of such various means.

In some embodiments, the layout location of connections 202a-202n and/or the connection types of connections 202a-202n are customized in accordance with specific requirements or with desired preferences for a building facility. Moreover, in some embodiments, the layout of connections 202a-202n and/or the connection types of connections 202a-202n are set forth in accordance with one or more standards. For example, it may be desirable to have a standardized type or size of connector for a given utility such as NEMA standard electrical connections, Victaulic™ piping connections, American Gas Association (AGA) piping connections, and the like. Likewise, it may be advantageous to utilize a standard layout for connections 202a-202n in order to facilitate simplified construction processes for a given building.

Figure 3:
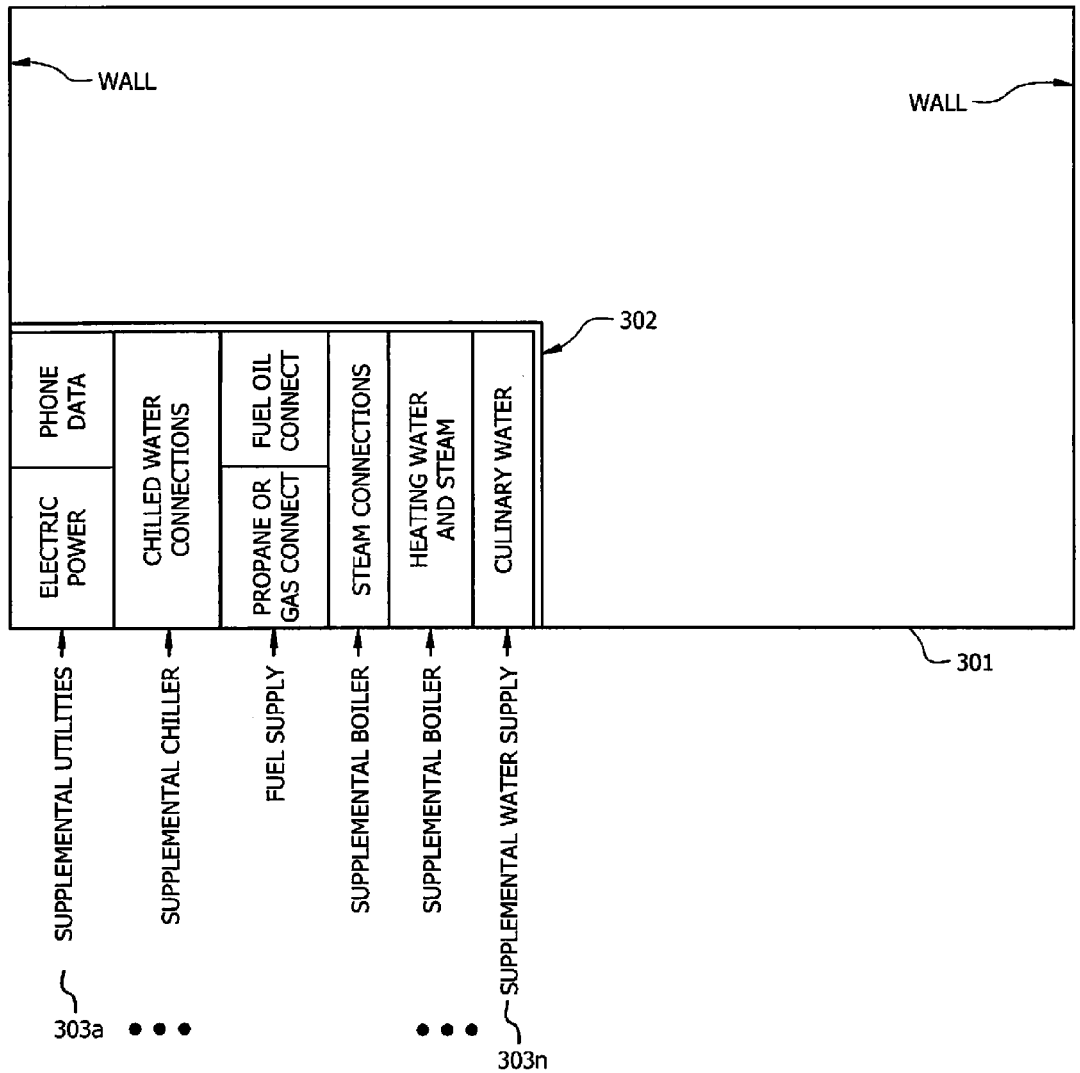
FIG. 3 illustrates a front view of an exterior wall of a building facility having a pre-fabricated supplemental utility connection panel in accordance with another embodiment of the present application.

FIG. 3 illustrates a front view of an exterior wall 301 of a building facility having a pre-fabricated supplemental utility connection panel 302 in accordance with another embodiment of the present application. In operation, supplemental utilities 303a-303n are connected to corresponding areas on panel 302 to provide the building facility with supplemental or backup utility access.

As discussed above, there may be considerations where a standardized layout of panel 302 is utilized. Such a standard panel may be implemented in order to facilitate ease of construction, comply with code requirements, and the like. When a specific desired layout is determined, panel 302 may be pre-engineered and fabricated to facilitate simple installation and functionality.

Further, while embodiments have been discussed in terms of research facilities, commercial buildings, and in terms of buildings in general, it is noted that embodiments may also have application on a smaller scale, such as in a residential environment, small commercial building (e.g. gas station and the like). For example, in one embodiment a connection panel area, such as area 200, may be disposed on an exterior surface of a residential building, inside a garage or storage area, or in any other location which would facilitate convenient access. In such embodiments, connections may include electrical, phone/data, hot/cold water and gas connections, etc. Additionally, as with embodiments discussed above, residential embodiments may also include valves or switching mechanisms to connect any supplemental or emergency utility supplies to existing supply lines within the residential building.

It is further noted that one or more utility connections may also be configured to be outgoing connections. In this manner, a user may utilize the utilities of a particular building for external purposes. Further, in one embodiment a user may connect to one utility in order to supplement another utility. For example, in the event of an electrical power outage, one embodiment may be configured to provide a gas supply from the building to power an emergency generator, which in turn is used to connect to an electrical connection point in order to provide electricity to the building.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for providing supplemental utility access to a building facility, said method comprising:
    forming a panel having a plurality of utility connection points corresponding to a plurality of utility types, said utility connection points configured to connect to one or more supplemental utility sources; and
    configuring at least one switching mechanism associated with said plurality of utility connection points within said building facility to connect supplemental utility sources to internal utility infrastructure of said building, said at least one switching mechanism being arranged to allow said supplemental utility sources to switch between functioning in lieu of and in addition to existing utility sources of said building facility.

2. The method of claim 1 wherein said utility connection points are configured to connect supplemental utility sources to provide one or more of: water, gas, steam, electricity, phone/data, oxygen, nitrogen and compressed air to the building facility.

3. The method of claim 1 wherein said panel is pre-fabricated to include said plurality of utility connection points.

4. The method of claim 1 wherein said plurality of utility connection points comprise at least one utility connection point sized and configured to specifically fit one of the plurality of supplemental utility sources.

5. A building comprising:
    a wall area;
    a supplemental utility connection panel having a plurality of connection points corresponding to at least two utility types, said supplemental utility connection panel disposed on said wall area; and
    at least one switching mechanism associated with said plurality of connection points and configured to connect supplemental utility sources to internal utility infrastructure of said wall area, said at least one switching mechanism being arranged to allow said supplemental utility sources to switch between functioning in lieu of and in addition to existing utility sources of said wall area.

6. The building of claim 5 wherein the wall area is part of an external wall of said building.

7. The building of claim 6 further comprising an enclosure structure configured to enclose said supplemental utility connection panel and said corresponding wall area.

8. The building of claim 7 wherein the enclosure structure includes a retractable door.

9. The building of claim 5 wherein said building is a commercial building.

10. The building of claim 5 wherein said building is a residential building.

11. The building of claim 5 wherein the wall area is located on the interior of a garage.

12. The building of claim 5 wherein said supplemental utility connection panel is a pre-fabricated panel configured to be installed on said wall area.

13. A supplemental utility connection panel comprising:
    a structural backing area;
    a plurality of connection points disposed on said structural backing area, said plurality of connection points corresponding to a plurality of utility types, wherein said plurality of connection points are configured to accept a connection from one or more supplemental utility sources and further configured to connect to internal infrastructure connection points for one or more respective utility types of said plurality of utility types; and a plurality of switching mechanisms arranged to allow said one or more supplemental utility sources to switch between functioning in lieu of and in addition to existing utility sources of a building facility.

14. The supplemental utility connection panel of claim 13 wherein said one or more respective utility types includes: water, gas, steam, electricity, phone/data, oxygen, nitrogen and compressed air.

15. The supplemental utility connection panel of claim 13 wherein a panel is pre-fabricated to include said plurality of utility connection points.

16. The supplemental utility connection panel of claim 13 wherein said plurality of connection points comprise at least one utility connection point sized and configured to specifically fit one of the plurality of supplemental utility sources.

17. The supplemental utility connection panel of claim 13 wherein a panel is configured for residential use and includes said plurality of utility connection points.

18. The supplemental utility connection panel of claim 13 wherein a panel is configured for commercial use and includes said plurality of utility connection points.

* * * * *